United States Patent Office 3,223,607
Patented Dec. 14, 1965

---

3,223,607
METHOD OF MANUFACTURING ELECTRICAL HEATING ELEMENTS WITH IMPROVED ALUMINUM OXIDE COATING
Tivadar Millner, Karoly Fukker, Kornel Martin, and Magda Dvorszky, all of Budapest, Hungary, assignors to Egyesult Izzolampa es Villamossagi Reszvenytarsasag, Budapest, Hungary, a Hungarian enterprise
No Drawing. Filed Feb. 23, 1960, Ser. No. 10,109
Claims priority, application Hungary Feb. 24, 1959, EE–635
2 Claims. (Cl. 204—181)

This invention relates to a novel method of manufacturing aluminum oxide with improved electrical insulating properties. The invention also aims to produce electrical heating elements, especially cathode heaters for radio tubes, provided with an improved aluminum oxide coating.

Insulating coatings made mainly from aluminum oxide, the starting material of which had been an aluminum oxide previously heated at a temperature higher than 1300° C., are well known in the art and are often used in the electron tube industry for insulating electrical heating elements, especially tungsten heating filaments operating on high temperatures, for example on a temperature between 700 and 1800° C. To ensure sufficient insulating properties even at this high operating temperature, as well as in order to obtain the necessary chemical neutrality, these insulating coatings are made from aluminum oxide powders, the granules of which are non-porous and have an alpha aluminum oxide structure. In order to obtain such powders the aluminum oxide has first to be molten, for example in an arc-oven under a purifying slug cover, thereafter to be stiffened into a compact corundum mass and thereafter be ground and washed. The grains of such a corundum powder are absolutely compact, that is to say, they are non-porous and clearly show, if viewed through a microscope with a linear magnification of 1000, the planes, edges and corners of said grains formed during the process of comminution. According to another known process of production, the calcined alumina is converted into corundum powder, preferably by using a lasting heating effected in the temperature range of 1300–1600° C., and is thereby also purified as its volatile impurities are removed by volatilisation during the heating. The granules of corundum powders produced by this method are generally not absolutely free from pores, that is to say, their slight porosity may be observed, but no sign of any cracks or of previous breakage can be observed on them.

These aluminum oxide powders, manufactured as mentioned above, being practically pure and having an alpha-aluminum oxide (corundum) structure, are mixed with a small percentage of ceramic additives which do not damage their insulating properties, for example with steatite powder, for manufacturing insulating layers on metallic heating elements. This is done by making from them a coating, adhering to said heating elements, by means of a suitable heat treatment. The insulating properties of such composite insulating layers depend, on the one hand, on the insulating properties of said aluminum oxide granules at the operating temperature of said coating, and on the other hand on the insulating properties of the ceramic additives constituting a cementing mass uniting said aluminum oxide granules to a coherent compact layer firmly adhered to the surface of the metallic heating element.

The main object of the invention is to improve the insulating properties of the aluminum oxide granules themselves.

Another object of the invention is to manufacture such an improved aluminum oxide which is adapted to be used, either alone or together with additives, for the manufacturing of electrical insulating layers, especially of insulating coatings on metallic heating elements of indirectly heated cathodes of radio tubes, said coatings having improved insulating properties.

Other objects and features of the invention will be seen from the detailed description below.

As described in the literature, pure aluminum oxide shows slightly semi-conductive properties at high temperatures and "its insulating property increases together with its oxygen content." This described observation led us to make investigations directed to ascertain whether the increasing of the oxygen content of the gaseous atmosphere present during the heat treatment of the aluminum oxide during its manufacturing process would result in obtaining such a corundum powder, insulating layers or coatings made from which would have improved insulating properties at the operating temperatures of said layers or coatings. Our investigations had been made with aluminum oxide samples made from the same starting alumina material, which had been heat-treated under identical conditions for some hours at a temperature of about 1600° C. in order to convert the treated samples into an aluminum oxide having a corundum structure. On occasion of these heat treatments we used three different types of gaseous atmospheres, one consisting of oxygen, the other of air, and the third of nitrogen, and we obtained a practically pure aluminum oxide powder with all of these heat treatments effected in different gaseous atmospheres.

As in actual manufacturing practice neither a heat treatment effected in an atmosphere of oxygen, nor a heat treatment effected in an atmosphere of nitrogen had been used for producing aluminum oxide; we considered that aluminum oxide to be substantially equal with known aluminum oxides which had been heated in air. For the sake of brevity, this kind will be termed hereinafter as "air" aluminum oxide and in a similar manner the kind heat-treated in an atmosphere of oxygen, "oxygen" aluminum oxide, and the kind heat-treated in an atmosphere of nitrogen, "nitrogen" aluminum oxide.

From these three types of aluminum oxides thus converted into corundum we made insulating coatings on tungsten wires to be used as heating elements of indirectly heated cathodes of radio tubes. We examined those heaters provided on their surface with these aluminum oxide coatings of different types, by means of the standardized examination methods of the art. We thus ascertained that the insulating coatings made from "air" aluminum oxide showed measurable leakage currents on occasion of their first use, said currents being of the same order of magnitude as those measured in actual manufacturing practice, when examining similar conventional coatings. The same examination showed, however, that heaters provided with "oxygen" type aluminum oxide insulating cotings allowed, on occasion of their first use, the passage of much stronger leakage currents, whereas heaters with "nitrogen" type aluminum oxide insulating coatings had leakage currents weaker than those of either "oxygen" or "air"-type aluminum oxide coatings. We have thus found—contrary to what had been stated in the literature—that by increasing the oxygen content of the atmosphere surrounding the aluminum oxide, on occasion of its heat-treatment, its insulating properties are not improved, but deteriorated. These investigations gave us the idea that we should try to improve the insulating properties of aluminum oxides by means of heat-treating them in an atmosphere containing less oxygen than those used hitherto, that is, for example, in hydrogen, or in hydrogen-containing gases. These experiments, during which we made a new discovery, led to the complete success hereinafter disclosed.

It is to be understood and noted, that in the present specification and claims the expression "non-oxygenous atmosphere" is intended to designate a gaseous atmosphere having a content of oxygen of at most 2% by unity volume, i.e., less than one-tenth of the oxygen content of the atmospheric air. Said atmosphere thus may also be a poor vacuum, wherein the unity of volume contains some traces of oxygen, the quantity of which, however, amounts to much less than 2% of said volume. The expression "oxygen-free atmosphere" of the present specification and claims is intended to designate a non-oxygenous gaseous atmosphere containing no oxygen at all, thus consisting, for example, of hydrogen and/or nitrogen. Such an atmosphere is preferably constituted by a stream of said gas or gaseous mixture, continuously flowing at moderate speed through the space it is intended to fill in order to exclude any oxygen therefrom, and thus being present at slightly super-atmospheric pressure in said space, for example in the heated chamber of an electric furnace, in order to prevent the infiltration of air into said chamber.

Relating to our new discovery constituting, in a certain sense, the basis of our present invention, we may state the following facts.

Many such oxides are known, the electrical conductivity of which—in their semiconductive state—can be increased or decreased by modifying the oxygen content of the gaseous atmosphere in which they are heated. In these oxides—according to the theory constituting the present or rather previous state of science relating to this question—the concentration of the lattice defects in their crystal lattice, which defects are responsible for the semiconductive properties, are in an equilibrium with the partial oxygen pressures of the said gaseous atmosphere and this equilibrium can be approached from both sides. According to what we have ascertained when heat-treating aluminum oxides, the facts described above may scarcely be observed in case of aluminum oxides at temperatures below 1700° C., and the composition of the gaseous atmosphere present on occasion of the heat treatment does not primarily and mainly influence the insulating properties of the aluminum oxide in the temperature range below 1700° C. in this way.

During our experiments we have ascertained, that if a previously molten aluminum oxide powder or an aluminum oxide powder which had been converted at a temperature of about 1600° C. into corundum, is heated later at a temperature of about 1600° C., either in hydrogen or in oxygen, for a substantial period of time amounting to at least an hour or so, its electrical conductivity and at the same time the average leakage current measured on occasion of the first actual operation of the heater having an insulating layer made from these powders, does not change at all if the heat treatment was effected in an atmosphere of hydrogen and changes only very slightly if the heat treatment was effected in an atmosphere of oxygen. If, however, the final stabilized corundum-crystal-structure of an aluminum oxide powder is formed by a heat treatment effected with a gradually increasing temperature up to about 1600° C., once in an atmosphere of hydrogen and once in an atmosphere of oxygen, which atmosphere is present from the beginning and up to the end of this heat treatment, and thereafter insulating coatings are made on metallic heater elements from these different powders, the two coatings thus produced will show, at the conventional operating temperatures of said heaters in their cathodes or the structure wherein they operate, leakage currents differing from each other with orders of magnitudes, that is to say a difference in their electrical conductivity amounting to orders of magnitudes can be ascertained.

According therefore to our new theory which appears to be supported by these facts, those characteristics of the corundum powder (i.e., its so-called semi-conductive property, electrical conductivity, etc.) which determine the practical insulating properties of said material at operating conditions of electron tube cathode heating elements, can be only influenced in a practical manner during the formation of the corundum lattice, that is to say, for example, during the gamma-alpha transformation of the material and during the formation of the larger, practically stabilized, corundum lattice parts, by changing the composition of the gaseous atmosphere in which this material is to be heated.

On the basis of what has been said above, we therefore have found that aluminum oxide powders with substantially improved insulating properties can be manufactured by forming their practically stabilized corundum-structure during a heat treatment effected in a non-oxygenous or oxygen-free atmosphere, and by effecting this heat treatment in such a manner that in the practical temperature and time range of the corundum structure formation and/or of the lattice growth, i.e., of the rapid grain growth, preferably a hydrogenous or hydrogen-containing atmosphere should be present.

Our new method of manufacturing aluminum oxide or aluminum oxide preparations with increased insulating properties according to our invention by means of transforming the starting aluminum oxide material by heat treatment into a final stabilized alpha-aluminum oxide of corundum structure is therefore characterized by heating said starting material at least during the formation of its alpha-aluminum-oxide-structure and/or during the formation of the stabilized alpha-aluminum-oxide-structure in a gaseous atmosphere which has an oxygen content ranging between at most 2% down to nil and which preferably contains or is constituted by hydrogen, so that hydrogen is preferably present in said atmosphere in any case.

According to our invention the heat treatment may thus take place for example in vacuo or eventually in an atmosphere of nitrogen, but we prefer to use an atmosphere of hydrogen. It is also possible to use gaseous mixtures consisting of hydrogen and nitrogen, for example an atmosphere which is a mixture of $H_2$ and $N_2$ and contains about 30% $H_2$ and 70% $N_2$ by volume.

We prefer to choose the temperature of the heat treatment effected in said atmosphere specified above in the temperature range of 700–1700° C., but in actual manufacturing practice the highest temperature is seldom above 1600° C.

We have to state that it is known, for example from the copending U.S. patent application Ser. No. 461,012 of same assignee (corresponding to the British patent specification No. 802,731), that, first of all, for ensuring good insulating properties of the non-aluminum-oxide ceramic cementing materials present in an aluminum oxide coating or layer, it is advisable to remove or at least to reduce under a given limit the sodium content of the aluminum oxide just in the temperature and time range of stabilized corundum structure formation. In case of an alumina this temperature range is about 1300–1500° C. The aforesaid reduction of the sodium content is effected in this known process by a heat treatment during which the sodium evaporates and/or migrates onto the surface of the aluminum oxide, and may be removed from said surface by a chemical treatment. A practically very valuable novel feature of the method according to our present invention is that it increases the insulating properties of the aluminum oxide grains themselves, in case, for example, of alumina starting material, just practically in the same temperature and time range in which this known removing of sodium may be effected, so that the method of the present invention may be performed together with said known sodium-removing process and thus at the same time the insulating properties as well of the aluminum oxide granules themselves as of the ceramic cementing materials to be used in the aluminum oxide coating may be increased.

It should be however stated, that our method for increasing the insulating properties of an aluminum oxide powder by heat treating it according to the invention may be used with good results independently from the purity of the starting material. Our new method thus may be used for treating highly pure aluminum oxide materials, or, alternatively, aluminum oxide preparations purified from the alkali impurities by any suitable method, or even for treating alumearth powders conventionally used for manufacturing metallic aluminum therefrom, that is to say, even for treating an aluminum oxide which is relatively less pure.

The aluminum oxide or aluminum oxide preparations manufactured according to our present invention have improved electrical insulating properties and at the same time they have a complete lattice structure of sintered material which however is not molten. The granules of the material are not necessarily compact, they are, in the majority of cases, of a rather loose structure and do not show any planes, edges and corners which would have been formed on occasion of breaking or cracking of said material.

A very characteristic property, perhaps the most characteristic property of the aluminum oxides made according to our invention, which have a final corundum structure and increased insulating properties is, that insulating coatings made from them by usual methods on the surface of metallic heating elements of electron tube cathodes show a leakage current on occasion of the first operating of said heating element, the average value of which current is, however, smaller with orders of magnitudes than the average value of the leakage currents of known aluminum oxide insulating coatings used for the same purpose, but made from aluminum oxide heat treated in the presence of oxygen, for example in atmospheric air. Thus by using an aluminum oxide made according to the present invention even that aging and forming process of electron tubes may be omitted which is conventionally used after their first operation in order of subsequently obtaining better insulating properties of said coating.

Briefly stated our invention consists in heat treating aluminum oxide powders in order to increase their insulating properties, in an atmosphere the oxygen content of which ranges from 2% down to nil, and preferably in the presence of hydrogen, at least in that temperature and time range during which the corundum (alpha-aluminum-oxide) structure is formed and/or smaller corundum lattice parts are growing and greater ones are formed, i.e. during the formation of the stabilized crystal structure.

It is clear from the foregoing description, that the method according to our invention may be performed in different manners. In order, however to show in a more detailed manner, how an aluminum oxide with improved electrical insulating properties and from this aluminum oxide an insulating coating of a cathode heating element adapted to be used in an indirectly heated cathode of a radio tube may be made, the following examples are given, to which however the invention is not limited.

*Example 1*

As starting material, and alumina (aluminum oxide) of the kind conventionally used for manufacturing metallic aluminum is used. This material was heated during its manufacturing up to a temperature of 1050° C., and thus contains, besides a varying amount of gamma aluminum oxide, also a certain amount of those fine alpha-aluminum oxide particles, which just begin getting formed at these temperatures. The material contains, in spite of its fairly high chemical purity, an analytically still well measurable amount of sodium and silicon impurities.

This material, in the shape of a powder of conventional grain size obtained during its conventional manufacture, is placed in the containers in which it is subjected to the heat treatment. These open containers, shortly termed "boats" in the art, may consist for example of molybdenum and may be lined with an adherent aluminum oxide coating on their inside, in order to prevent the said powder contacting with the molybdenum. The length of these boats may be 160 mm., their width 35 mm., their height 25 mm., and they are filled with the powder to a height of about 20 mm. These boats are pushed through an electrically heated oven, with such a speed, that the aluminum oxide content of the boats should reach—starting from room temperature—the temperature of about 1100° C. in half an hour, then the temperature of about 1500° C. in a further 30 minutes. Thereafter a lasting heating follows for a period of about 3 hours at a temperature of 1550° C., and after this the material is allowed to cool down, during an hour or so, to 1100° C. and to slowly reach again the normal room temperature by further gradual cooling. The whole heat treatment described above is carried out in an atmosphere of pure hydrogen. The hydrogen is present in the heated tunnel of the oven at slightly super-atmospheric pressure and is streaming through it slowly in a direction opposite to the direction of motion of the boats.

The aluminum oxide powder obtained by this heat treatment is ground, together with 0.1% by weight of steatite powder, in a ball-mill. From the fine powder thus obtained, a layer having a thickness of about 0.1 mm. is formed by a known method, for example by electrophoresis, on the surface of the tungsten wire to be coated, this total surface being about 300–400 mm.$^2$. This tungsten filament is coil-shaped consisting of a wire of the diameter of 57.2$\mu$, wound to a coil of the internal diameter of 0.25 mm., and having 10.5 turns for each millimeter of its length. The coating thus produced on the tungsten wire is thereafter subjected to the conventional heat treatment used also for producing sintered coatings from other aluminum oxide powders on tungsten wires and thus superfluous to detail. By this heat treatment, a firmly adhering insulating coating is produced on the coil-shaped tungsten wire, the wall thickness of said finished coating ranging between about 91 and 131$\mu$ and thus a coil-shaped heating element is obtained, the external diameter of which ranges between about 0.55 and 0.63 millimeter.

We mounted the insulated tungsten filaments specified above into cathodes of the indirectly heated type, of conventional structure and design, and provided electron tubes of conventional design with these cathodes. Comparative tests effected with 100 of these tubes and 100 exactly similar tubes, provided with heating elements of exactly the same structure, the insulating coatings of which however had been made from "air" type aluminum oxide, gave the following results, when tested under normal operating conditions. In these normal operating conditions the filament temperature of the insulated heating elements was about 850° C., exactly determined by the fact, that at this operating temperature the electrical resistance of the filament was six times as high as at room temperature, the filaments being heated so as to obtain this resistance value during their operation. A test voltage of 150 volts D.C. was used between the filaments of the heating elements and the nickel tubes constituting the cathode bodies, and the negative pole of the test voltage source was connected to said cathode bodies. The leakage currents of all the 100 tubes provided with the heating elements according to the invention, specified above, had values below 100 microamperes during the time of their first operation in the tubes. Tested under the same conditions 100 of the other electron tubes of the same type, having a cathode heater insulation made from air type aluminum oxide showed the following data: Out of 100 tubes only 17 tubes had leakage current values under 100 $\mu$a. on occasion of their first operation, while 64 tubes had leakage current values between 100 and 1000 $\mu$a., and 19 tubes had leakage current values higher than 1000 $\mu$a.

The excellent insulating qualities of the "hydrogen" type aluminum oxide, i.e. an aluminum oxide heat-treated according to our invention in hydrogen, when used as insulating coating of cathode heaters may be even seen better if the comparison is made with tubes which had been electrically formed by the usual aging process after their first operation, which aging is customary in the art for lessening the leakage currents of the insulating layers of cathode heaters. Tubes having a "hydrogen" type aluminum oxide insulated cathode heating element, which had been aged, gave the following test result: 100 out of 100 tested tubes showed leakage currents below 20 $\mu$a. and 60 out of these 100 had leakage currents even below 5 $\mu$a. 100 comparison tubes having "air" type aluminum oxide-insulated cathode heaters, tested under identical conditions after identical aging, showed the following results: Only 17 tubes had leakage currents below 100 $\mu$a. after the aging process, and the leakage current values of 83 tubes out of those 100 remained, even after the aging process, between 100 and 900 $\mu$a.

Another kind of test gave the following results:

10 electron tubes, each having on their cathode heater a "hydrogen" type aluminum oxide insulating coating, had been set out to a lasting permanent heating of their cathodes under normal operating conditions, during which the cathode heater elements also proved their very good electrical properties. This means, that besides a very small leakage current value, good disruptive dielectric strength (electrical breakdown resistance) was found, i.e. during this operation very few breakdowns occurred. These few breakdowns only occurred during the late stage of this operation. During an operation lasting about 1000 hours no breakdown of the insulating coatings of the heater elements occurred. On occasion of identical tests, out of 10 electron tubes of the same type, but having an "air" type aluminum oxide insulating coating on their cathode heaters, during the same lasting heating, 6 tubes had a breakdown before 1000 hours of operation, and 1 of those breakdowns occurred even before 100 hours of operation.

It is an interesting fact, that when manufacturing insulting coatings from the new aluminum oxide powder of the "hydrogen" type on metallic bodies by electrophoresis, preparations made from the new powder migrate towards and are deposited on the cathode.

*Example 2*

As starting material we used the same material as in Example 1, that is to say, an aluminum oxide which had been heated previously up to a temperature of 1050° C., and thus contains gamma aluminum oxide particles as well as some fine alpha aluminum oxide particles. It is practically pure, but has a measurable content of sodium and silicon impurities.

Boats specified in Example 1 and filled with this aluminum oxide powder to a height of 20–25 mm. are pushed through the oven specified in Example 1. The atmosphere of this oven is however a mixture of about 30% hydrogen and about 70% nitrogen (these percents being by volume) which mixture is practically free from oxygen and/or of oxygen compounds and flows through said oven in a continuous counter flow, as stated in Example 1. The boats travel with such a speed, that they should be in the oven on a temperature of 1550° C. for at least 3 hours. Heating to this temperature and cooling to room temperature is effected at about the rate described in Example 1. The aluminum oxide powder thus obtained is mixed with 0.1% by weight of steatite powder and is ground together with it in a ball mill.

From this mixture a coating is made by electrophoresis on a coiled tungsten filament. The diameter of the tungsten wire is 86.9$\mu$, and this wire constitutes a coil of the internal diameter of 0.13 mm., having 4.55 turns per mm. of coil length. Coils of about 64 mm. length are provided with the coating so that the coated metallic surface amounts to about 40–60 mm.$^2$, together with the uncoiled ends of the coil. The external diameter of the coated coil amounts to about 0.41 to 0.48 mm., and the wall thickness of the finished coating is between about 53 and 177$\mu$. The coating produced by electrophoresis is heat-treated in a conventional, known manner, superfluous to detail here, in order to sinter it onto the filament and thus to finish the manufacture of the insulated heating element itself.

Electrical heating elements of the indirectly heated cathodes of electron tubes consisting of the coated coils specified above, have been subjected to testing under normal operating conditions in 100 tubes. 100 electron tubes out of the tested 100 showed leakage currents below 100$\mu$a. and 60 out of these 100 tubes had leakage current values below 60$\mu$a. Tested under the same conditions, 100 tubes of the same type, but made for comparison with "air" type aluminum oxide-coated heating filaments, showed substantially higher average values of the leakage currents, as only 20 out of these 100 tubes had leakage current values below 20$\mu$a., the leakage currents of the other 80 tubes being between 100 and 200$\mu$a.

After the so-called aging process 100 out of 100 tested tubes having cathodes containing a heating element provided with a coating from "hydrogen-nitrogen" type aluminum oxide described in this example showed leakage current values lower than 30$\mu$a., and 70 tubes out of these 100 tubes showed leakage currents below 15$\mu$a. The comparison tubes having "air"-type aluminum oxide coatings on their cathode heaters gave, tested under identical conditions, the following results: Only 35 of the 100 tested tubes had leakage currents below 30$\mu$a., and the other 65 tubes leakage currents between 30 and 70$\mu$a.

After the lasting heating the "hydrogen-nitrogen" type aluminum oxide coatings showed still very good insulating characteristics, that is to say, their leakage current was weak and their dielectric strength was very good. No breakdown could be observed on any of the 10 examined tubes after having operated them under normal operating conditions continuously for 500 hours. Tested under identical conditions "air" type aluminum oxide coatings gave worse results. On 3 out of the 10 tested tubes, the cathodes of which had heating elements with "air" type aluminum oxide insulation, electrical breakdown occurred before the end of the 500 hours and one of these breakdowns occurred before 200 hours of continuous operation, under said normal operating conditions.

On occasion of the electrophoresis, the preparations containing the "hydrogen-nitrogen" type aluminum oxides deposited themselves onto the anode.

It should be finally mentioned, that the electron tubes of Example 1 and Example 2 had been tubes of different types, both of which, however, were quite conventional.

It is to be understood and obvious to those skilled in this art, that various changes and modifications may be effected in carrying out the present invention without departing from the spirit and scope thereof and therefore the aim in the appended claims is to cover all such changes and modifications as fall within the true spirit and scope of this invention.

What we claim is:

1. In the production of electrical heating elements by steps comprising coating said elements with aluminum oxide, wherein said aluminum oxide is subjected to heat treatment, the improvement which comprises initially heating the aluminum oxide which is predominantly in the gamma state to a temperature in the range of 700° to 1700° C. in a non-oxygenous atmosphere formed by a gas selected from the group consisting of hydrogen, nitrogen, and mixtures thereof, so as to convert said gamma-aluminum oxide essentially entirely to a stabilized alpha-aluminum oxide having maximum insulating properties while providing minimum leakage loss, and applying said alpha-aluminum oxide as an insulative coating to a metallic heating element.

2. The method of claim 1 wherein the stabilized aluminum oxide is applied as an insulating coating electrophoretically.

References Cited by the Examiner
UNITED STATES PATENTS

| | | | |
|---|---|---|---|
| 2,141,444 | 12/1938 | Nordberg | 23—142 |
| 2,642,337 | 6/1953 | Newsome | 23—142 |
| 2,754,176 | 7/1956 | Kimberlin | 23—142 |
| 2,769,687 | 11/1956 | Porter et al. | 23—142 |
| 2,773,741 | 12/1956 | Antonsen | 23—142 |
| 2,810,182 | 10/1957 | Brandes | 106—65 |
| 2,885,334 | 5/1959 | Green | 106—65 |
| 2,961,296 | 11/1960 | Fenerty | 23—142 |

FOREIGN PATENTS 771,411 4/1957 Great Britain.

OTHER REFERENCES

Bidgoode et al.: "Cataphoresis and Alundum Coatings," Transactions of the Electrochemical Society, Volume 87, 1945, pages 321–329.

Navias: Journal American Ceram. Society, Volume 14, pages 365–75 (1931).

JOHN H. MACK, *Primary Examiner.*

MURRAY TILLMAN, WINSTON A. DOUGLAS,
*Examiners.*